(12) United States Patent
Daugulis et al.

(10) Patent No.: US 6,284,523 B1
(45) Date of Patent: *Sep. 4, 2001

(54) PROCESS FOR BIODEGRADATION OF A XENOBIOTIC

(76) Inventors: Andrew J. Daugulis, 98 College Street, Kingston, Ontario (CA), K7L 4L6; Lisa D. Collins, 85 Emmett Avenue, Apt. 1712, Toronto, Ontario (CA), M6M 5A2

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,493

(22) Filed: Sep. 18, 1998

Related U.S. Application Data

(60) Provisional application No. 60/059,564, filed on Sep. 19, 1997.

(51) Int. Cl.[7] ............... B09B 3/00; C02F 3/00; C02F 3/02; C12N 1/00; C12N 1/20
(52) U.S. Cl. ............ 435/262.5; 210/600; 210/610; 435/863; 435/877
(58) Field of Search ............... 435/262, 262.5, 435/822, 830, 863, 874, 877; 210/600, 610

(56) References Cited

U.S. PATENT DOCUMENTS

| | | | |
|---|---|---|---|
| 4,761,376 | * 8/1988 | Kulpa et al. | 435/262 |
| 4,803,166 | * 2/1989 | Kulpa et al. | 435/253.3 |
| 4,804,629 | * 2/1989 | Roy | 435/253.3 |
| 4,816,403 | * 3/1989 | Roy | 435/253.3 |
| 5,100,800 | * 3/1992 | Kulpa et al. | 435/264 |

OTHER PUBLICATIONS

"Use of A Two Phase Partitioning Bioreactor For The Biodegradation Of Phenol", L.D. Collins & A.J. Daugulis, Biotechnology Techniques, vol. 10, No. 9, Sep. 1996, pp. 643–648.

"Biodegradation Of Phenol At High Initial Concentrations In Two–Phase Partitioning Batch And Fed–Batch Bioreactors", L.D. Collins & A.J. Daugulis, Dept. of Chemical Engineering, Queen's University, Kingston, Ontario, Canada. 1997.

* cited by examiner

Primary Examiner—Deborah K. Ware
(74) Attorney, Agent, or Firm—H. Jay Spiegel

(57) ABSTRACT

A process for biodegradation of a xenobiotic. A process for biodegradation of a xenobiotic comprising the steps of: contacting an organic phase comprising the xenobiotic and at least one substantially water-immiscible organic solvent with an aqueous phase comprising water and a microorganism capable of metabolizing the xenobiotic; partitioning a portion of the xenobiotic from the organic phase to the aqueous phase such that the concentration of the xenobiotic in the aqueous phase is substantially non-toxic to the microorganism; and causing the microorganism to metabolize the xenobiotic in the aqueous phase.

23 Claims, 6 Drawing Sheets

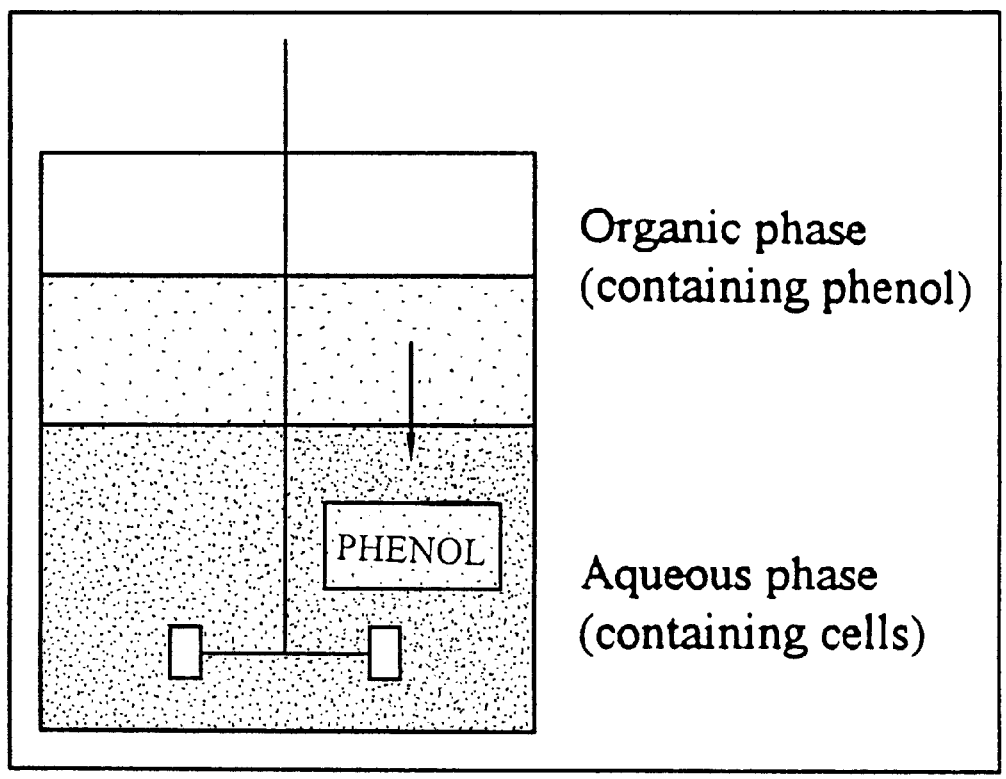
FIGURE 1: SCHEMATIC DRAWING OF TWO PHASE BIOREACTOR

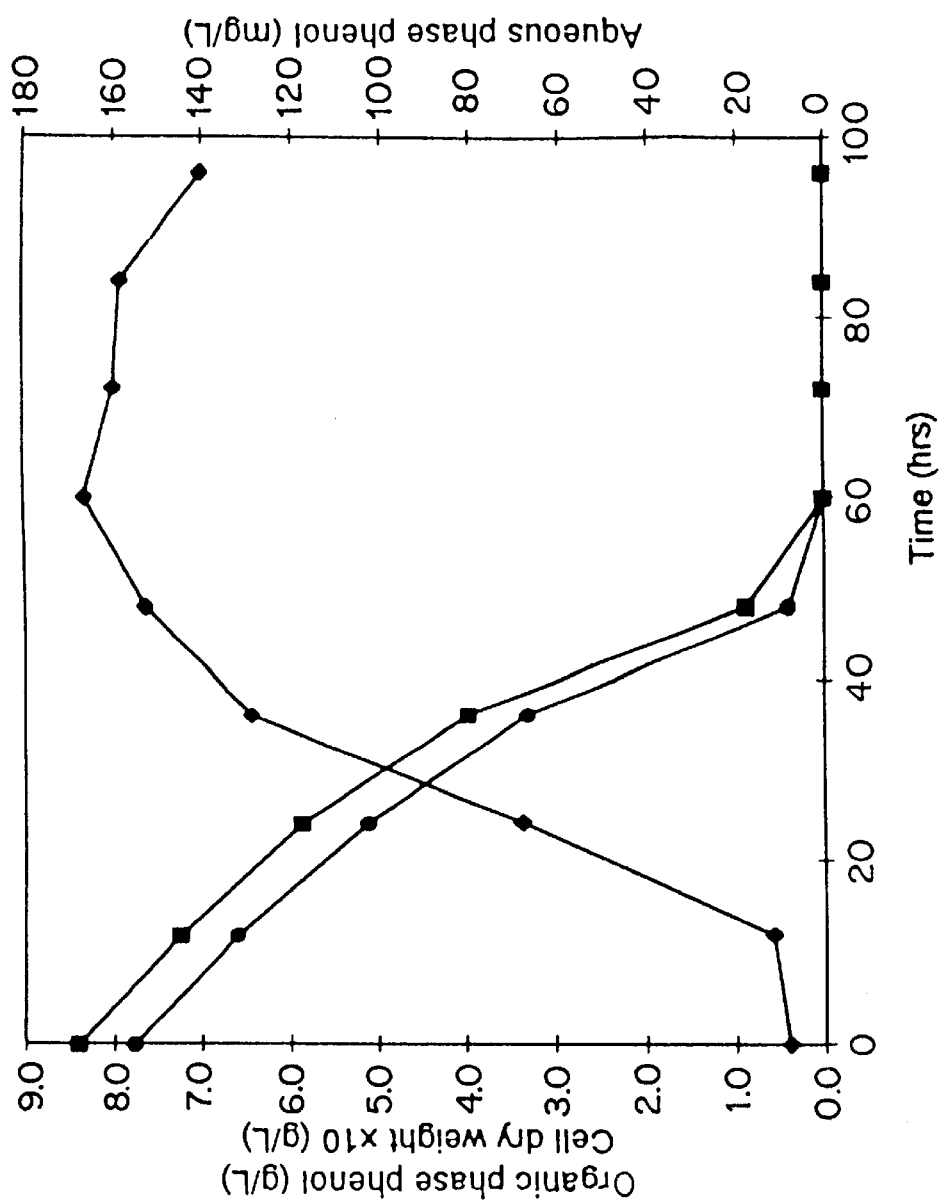

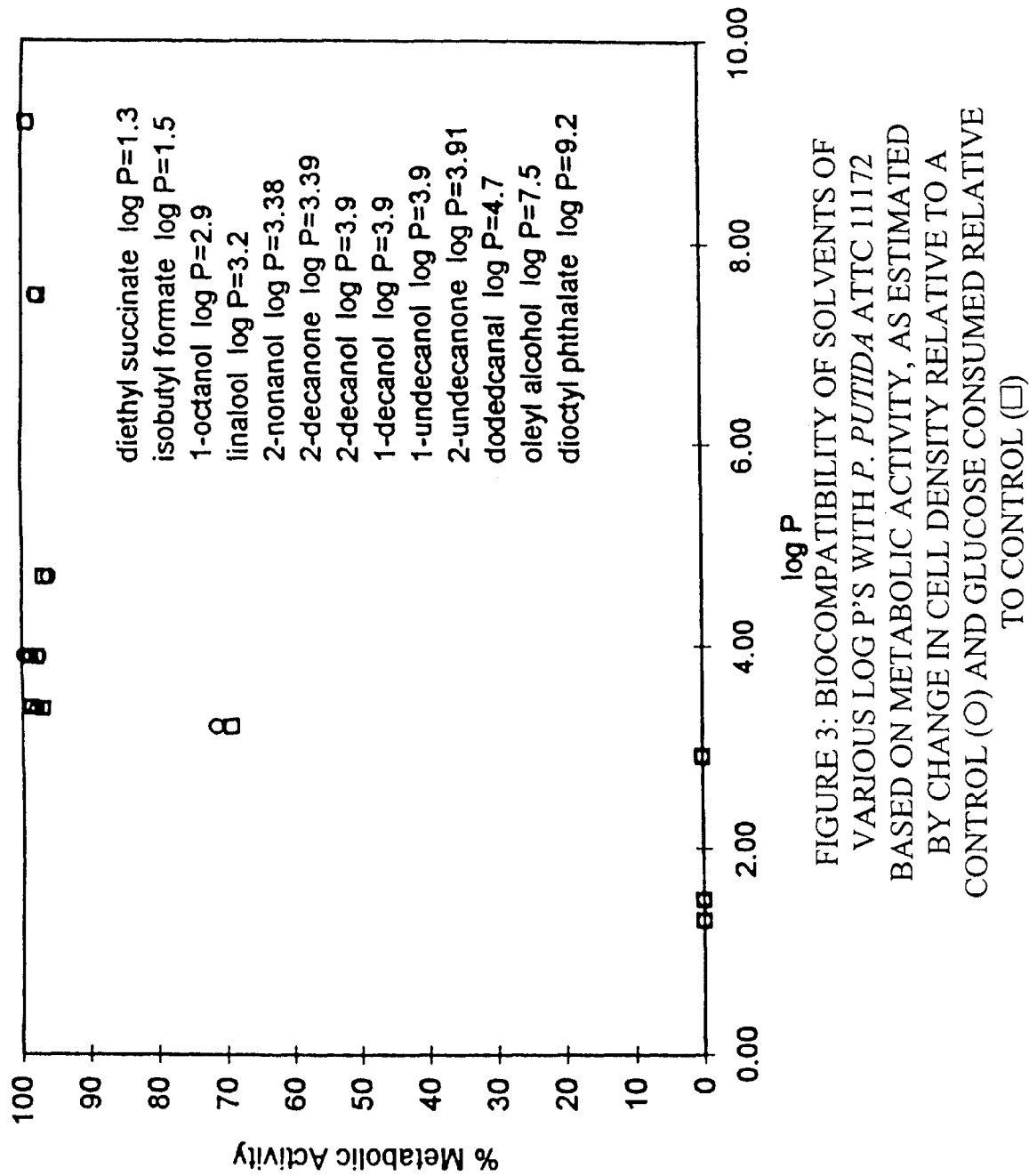
FIGURE 3: BIOCOMPATIBILITY OF SOLVENTS OF VARIOUS LOG P'S WITH *P. PUTIDA* ATTC 11172 BASED ON METABOLIC ACTIVITY, AS ESTIMATED BY CHANGE IN CELL DENSITY RELATIVE TO A CONTROL (O) AND GLUCOSE CONSUMED RELATIVE TO CONTROL (□)

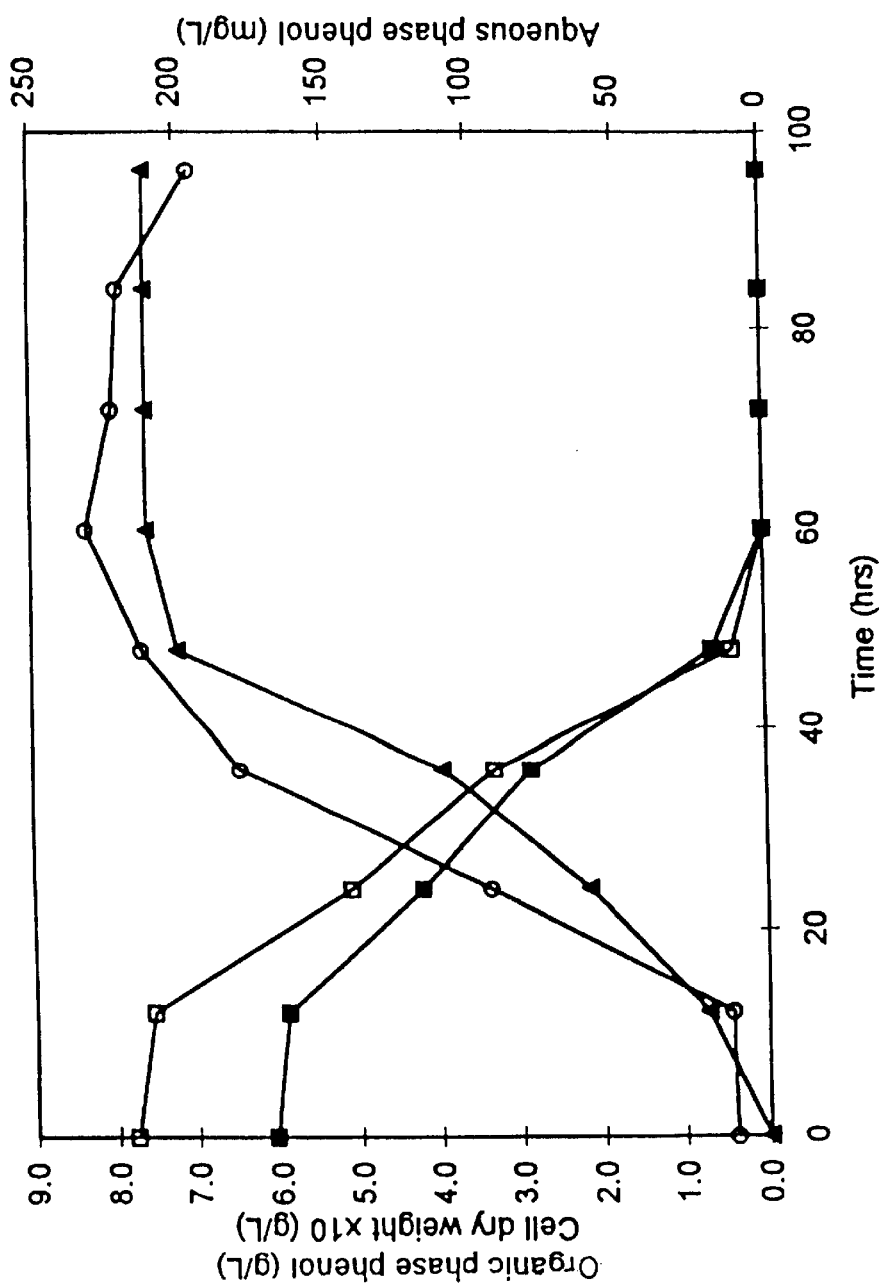
FIGURE 4: TIME COURSE PLOT OF ORGANIC PHASE PHENOL CONCENTRATION (□), AQUEOUS PHASE PHENOL CONCENTRATION (■), CELL DRY WEIGHT (x 10) (○) AND BASE CONSUMED (x 10) (▲) DURING FERMENTATION

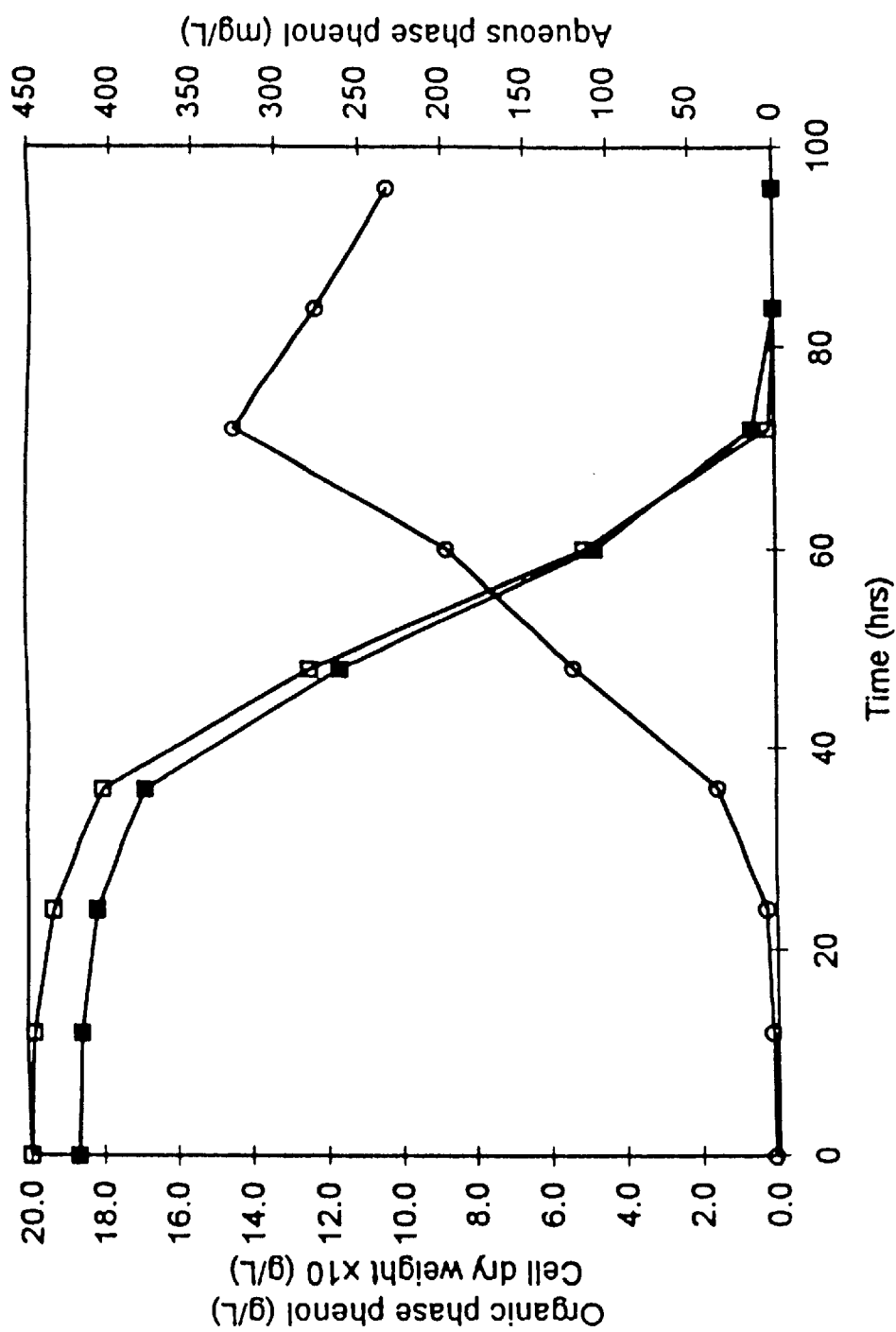
FIGURE 5: ORGANIC PHASE CONCENTRATION (□), AQUEOUS PHASE PHENOL CONCENTRATION (■) AND CELL DRY WEIGHT (×10) (○) AS A FUNCTION OF TIME IN THE REACTOR

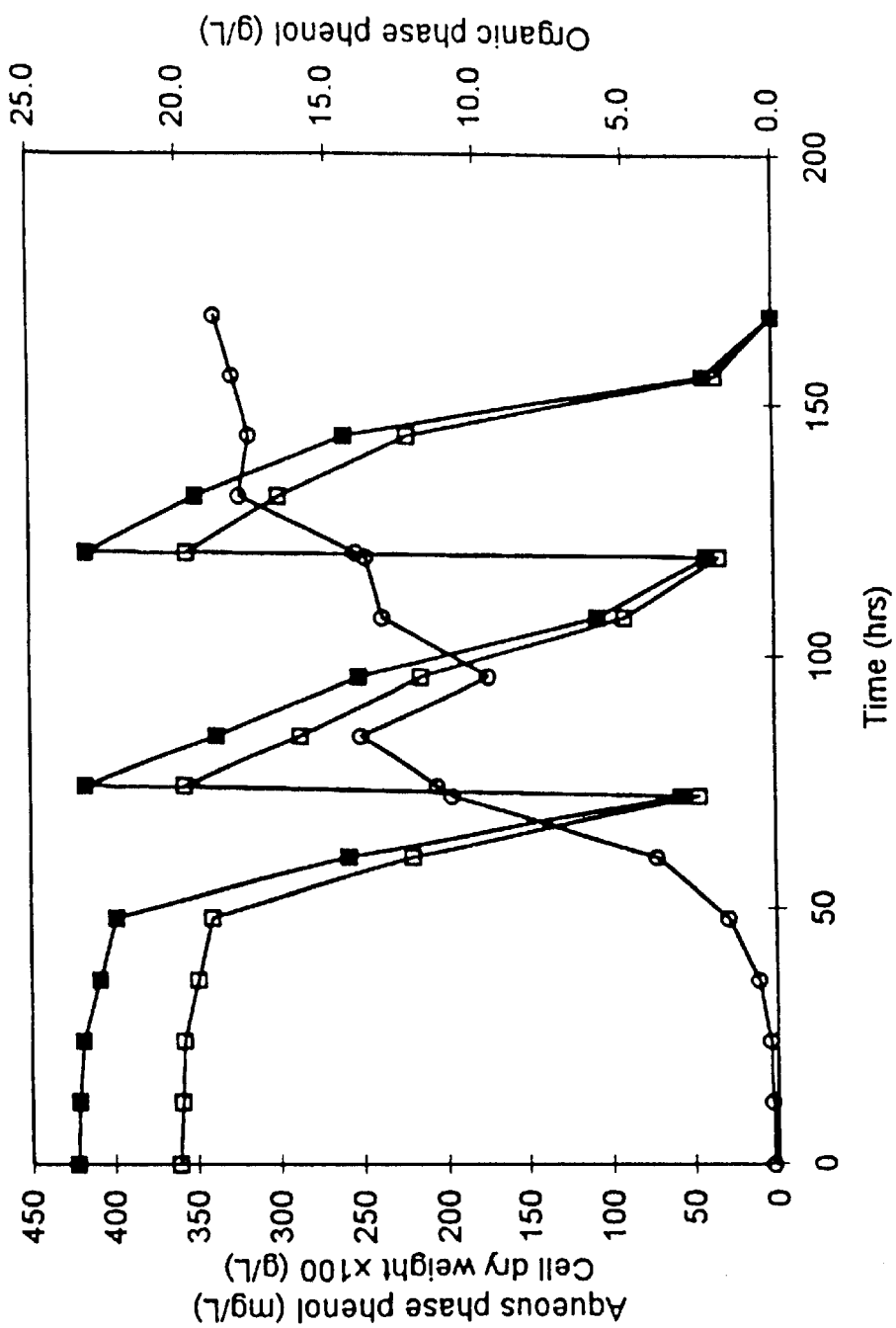
FIGURE 6: ORGANIC PHASE PHENOL CONCENTRATION (□), AQUEOUS PHASE PHENOL CONCENTRATION (■) AND CELL DRY WEIGHT (× 100) (○) WITH TIME IN THE REACTOR

PROCESS FOR BIODEGRADATION OF A XENOBIOTIC

This application claims priority from Provisional Application No. 60/059,564 filed Sep. 19, 1997.

BACKGROUND OF THE INVENTION

1. Field of the Invention

This invention relates to technology for the treatment of toxic organic pollutants, also known as xenobiotics. More particularly, the present invention relates to a process for biodegradation of a xenobiotic using a two-phase partitioning bioreactor.

2. Description of the Prior Art

Xenobiotics are toxic organic compounds which are manufactured by major multinational chemical producers and are used extensively by downstream producers of plastics and other chemical products. They include compounds such as benzene, toluene, and styrene, as well as halogenated organic compounds such as pentachlorophenol and PCBs. These pollutants are often present in process waste streams in fairly low concentrations, or may be present in larger quantities as spills, or in the soil and water associated with abandoned industrial sites in North America and former Eastern Bloc countries. These compounds are generally highly toxic to life forms (including humans), are exceedingly difficult to dispose of, and are of major concern to industry (because of the cost and/or difficulty of treatment) and to regulatory agencies.

Xenobiotics, whether they occur in process waste streams or in spills, can be treated by physical, chemical and biological means. For example, air and water streams containing these toxic compounds can be contacted with activated carbon particles contained within adsorption columns, and thus these materials are physically removed. A significant drawback of this approach is that the xenobiotics adsorbed onto the carbon are not destroyed, only physically removed from the contaminated stream, and therefore some subsequent disposal method must be employed as a final means of destruction. Xenobiotics may also be removed by incineration (a chemical method), however this approach requires costly high temperature and/or pressure equipment and may also release undesirable combustion products to the atmosphere. Moreover, if the xenobiotic is present in the contaminated stream at low concentrations, very large volumes need to be incinerated, with associated high costs. Biological treatment of xenobiotics involves the addition of these materials to bioreactors (essentially stirred tanks containing aqueous suspensions of microorganisms) which operate at ambient conditions, and which can ultimately degrade these materials to harmless end products such as carbon dioxide and water. Although potentially the lowest cost approach to xenobiotics destruction, current biological treatment of toxic organics has a fundamental inefficiency.

In the simplest form of biological treatment xenobiotics are added to conventional biological wastewater treatment systems, with the hope that the microorganisms naturally present in such systems will degrade (typically by metabolization) and eliminate these compounds. However, even though xenobiotics can be "food" to microorganisms, they are toxic compounds and, if added in too high a concentration or too quickly, can kill all of the microorganisms present in a conventional wastewater treatment system. If added too slowly, the microorganisms present in a biotreatment system could starve, or could lose their ability to consume these compounds. The basic inefficiency, and problem, therefore, is how to deliver these compounds to a xenobiotic biotreatment systems in a controlled fashion, fast enough not to starve the microorganisms, but not so quickly so as to kill them.

In particular, phenol has been a troublesome pollutant in the environment throughout the last century. It is present in many industrial effluents and is currently removed by costly and relatively inefficient physical or chemical methods. Current methods of treatment often produce other toxic end products as well, requiring further processing steps (Kobayashi et al.[1]).

Microorganisms that can degrade phenol were isolated as early as 1908 (Evans[2]) Current technology permits the use of these microorganisms in batch and continuous processes, using either suspended or immobilized cultures. The difficulty associated with many conventional batch reactors is that the initial substrate concentration must be lower than the value at which the organisms are inhibited, which, for most xenobiotics, results in a very low concentration of xenobiotic being degraded in a relatively long period of time. Increasing the initial substrate concentration in a batch reactor simply prolongs the process, by increasing the duration of the lag phase (Andrews[3])—this results in an overall decrease in the efficiency of the process.

In a continuous culture, low dilution rates are necessary to avoid process instability or low conversion (Pawlowsky et al.[4]). In addition to the low dilution rates required, most continuous cultures using an inhibitory substrate will have higher productivities and increased stability if the cells are immobilized. As such, the surface area within the fermentation vessel must be maximized to promote wall growth (Molin et al.[5]). However, biofilm formation within a reactor leads to difficulties in operational control, and requires very high levels of aeration and agitation to deliver the required oxygen and nutrients to the immobilized cells.

Two-phase bioreactor systems have previously been used in extractive fermentation (Barton et al.[6] and Jones et al.[7]). The organic phase in these fermentations is used to selectively remove the inhibitory end product from the aqueous phase as it is produced. This reactor scheme has numerous advantages, allowing for greater productivity within the system due to the absence of inhibition, and allowing for reduced water usage, as the substrate can be introduced at high concentrations without requiring prior dilution (Daugulis et al.[8]). The overall concentration of the inhibitory substrate in the system is very high, but the concentration of substrate in the aqueous phase can be maintained well below inhibitory levels (Vermue et al.[9]).

This configuration has been used to degrade styrene in a silicon oil/aqueous system (El Aalam et al.[10]); however, the solvent used was not systematically selected in order to optimize the system.

Thus, although there have been advances made in the art, there is room for improvement. Specifically, it would be desirable to have a process which has improved efficiency and can be selectively operated in a batch, semi-batch (also known as "fed batch" or "sequential batch") or continuous mode to biodegrade a xenobiotic.

SUMMARY OF THE INVENTION

It is an object of the present invention to provide a novel process for biodegradation of a xenobiotic.

Accordingly, in one of its aspects, the present invention provides a process for biodegradation of a xenobiotic comprising the steps of:

(i) preparing an organic phase comprising the xenobiotic and at least one substantially water-immiscible organic solvent;

(ii) preparing an aqueous phase comprising water and a microorganism capable of metabolizing the xenobiotic;

(iii) contacting the organic phase and the aqueous phase in a reactor;

(iv) partitioning a portion of the xenobiotic from the organic phase to the aqueous phase such that the concentration of the xenobiotic in the aqueous phase is substantially non-toxic to the microorganism;

(v) causing the microorganism to metabolize the xenobiotic in the aqueous phase; and (vi) repeating Steps (iv) and (v) until the concentration of xenobiotic in the organic phase is reduced to a predetermined value.

In another of its aspects, the present invention provides a continuous process for biodegradation of a xenobiotic comprising the steps of:

(i) preparing an organic phase comprising the xenobiotic and at least one substantially water-immiscible organic solvent;

(ii) preparing an aqueous phase comprising water and a microorganism capable of metabolizing the xenobiotic;

(iii) contacting the organic phase and the aqueous phase in a reactor;

(iv) partitioning a portion of the xenobiotic from the organic phase to the aqueous phase such that the concentration of the xenobiotic in the aqueous phase is substantially non-toxic to the microorganism;

(v) causing the microorganism to metabolize the xenobiotic in the aqueous phase; and (vi) adding further xenobiotic to the organic phase.

In yet another of its aspects, the present invention provides a process for biodegradation of a xenobiotic comprising the steps of:

contacting an organic phase comprising the xenobiotic and at least one substantially water-immiscible organic solvent with an aqueous phase comprising water and a microorganism capable of metabolizing the xenobiotic;

partitioning a portion of the xenobiotic from the organic phase to the aqueous phase such that the concentration of the xenobiotic in the aqueous phase is substantially non-toxic to the microorganism; and causing the microorganism to metabolize the xenobiotic in the aqueous phase.

BRIEF DESCRIPTION OF THE DRAWINGS

Embodiments of the present invention will be described with reference to the accompanying drawings, in which:

FIG. 1 is a schematic diagram of a two phase bioreactor;

FIG. 2 is a diagram of the phenol concentration in the aqueous phase and organic phase and the cell dry weight as a function of time for Example 1;

FIG. 3 is a diagram of biocompatibility of solvents of various log P's with *Pseudomonas putida* ATCC 11172 of Example 2;

FIG. 4 is a diagram of the time/course plot of phenol concentrations in the aqueous phase and organic phase and the cell dry weight during fermentation for the degradation of 4 g of phenol in Example 2;

FIG. 5 is a diagram of the time/course plot of phenol concentrations in the aqueous phase and organic phase and the cell dry weight during fermentation for the degradation of 10 g of phenol in Example 2; and FIG. 6 is a diagram of the time/course plot of phenol concentrations in the aqueous phase and organic phase and the cell dry weight during fermentation for the degradation of 28 g of phenol in Example 2.

DETAILED DESCRIPTION OF THE PREFERRED EMBODIMENTS

The delivery of a xenobiotic in the present invention preferably involves a two-phase partitioning bioreactor. Preferably, the two phases are an organic water immiscible phase initially containing the xenobiotic and an aqueous phase. The immiscible solvent containing the xenobiotic is used in a two-phase bioreactor system as a pool of substrate ("food") to deliver the xenobiotic at levels which are acceptable (i.e., substantially non-toxic) to the microbes present in the aqueous phase. In such a system an equilibrium is established with the xenobiotic continually partitioning into the aqueous phase at a concentration which reflects its relative solubility in each of the two phases. Thus, as cells consume the xenobiotic, more of it is transferred to the aqueous phase.

The organic water immiscible phase should be properly selected. There are a number of useful criteria for solvent selection used in extractive fermentation. Preferably, the solvent is biocompatible, nonbiodegradable, nonvolatile and has a low solubility in the aqueous phase, and has a high-partition coefficient for the inhibitory compound.

By proper selection of the solvent, the aqueous phase concentration of xenobiotic can be kept below levels which would be toxic to the cells. As the cells consume a certain amount of the xenobiotic, a "dis-equilibrium" is established, which is immediately rectified by the partitioning of more xenobiotic into the aqueous phase. In this way, the desired amount of xenobiotic is transferred into the aqueous phase and in direct response to the activity of the degrading microorganisms.

A preferred initial step in the present process involves preparing an organic phase comprising the xenobiotic and at least one substantially water-immiscible organic solvent.

In one preferred embodiment, the organic solvent has a partition coefficient of at least about 20, more preferably at least about 25, even more preferably at least about 30, most preferably at least about 35. The partition coefficient for a particular solvent may be readlily determined. See, for example, the discussion and references cited in the Examples set out hereinbelow.

In another preferred embodiment, the organic solvent has a log P value of at least about 2.5, more preferably at least about 2.8, most preferably at least about 3.2. The log P value for a particular solvent may be readlily determined. See, for example, the discussion and references cited in the Examples set out hereinbelow.

In yet another preferred embodiment, the organic solvent has a partition coefficient of at least about 25 and a log P value of at least about 2.5. In this embodiment, it is more preferred that the organic solvent has a partition coefficient of at least about 30 and a log P value of at least about 2.8. Most preferably in this embodiment, the organic solvent has a partition coefficient of at least about 35 and a log P value of at least about 3.2. Partition coefficient and log P value for a particular solvent may be determined as described hereinabove.

Preferably, the organic solvent may be selected from the group comprising alcohols, ketones, esters, aldehydes and mixtures thereof. Preferably, these organic solvents are $C_8$ and higher to improve biocompatibility with the microorganism. Of course, as will be appreciated by those of skill in the art, such solvents may be saturated or unsaturated, and the may be linear or branched. Non-limiting examples of a suitable organic solvent may be selected from the group comprising 1-nonanol, 2-nonanol, 3-nonanol, 1-decanol, 2-decanol, 3-decanol, 1-undecanol, 2-undecanol, 3-undecanol, 1-dodecanol, 2-dodecanol, 3-dodecanol, 1-nonanone, 2-nonanone, 3-nonanone, 1-decanone, 2-decanone, 3-decanone, 1-undecanone, 2-undecanone, 3-undecanone, 1-tridecadione, 2-tridecadione, 3-tridecadione, 1-tetradecadione, 2-tetradecadione, 3-tetradecadione, decen-1-ol, oleyl alcohol, diethyl sebacate, diethyl suberate, diethyl azelate, octyl acetate, ethyl heptanoate, structural isomers thereof and mixtures thereof. Most preferably, the organic solvent comprises 2-undecanone.

The choice of xenobiotic is not particularly restricted and is within the purview of a person skilled in the art. Preferably, the xenobiotic is an organic compound which may be unsubstituted or substituted by a group such as amino, cyano, halide and the like. In one embodiment, non-limiting examples of a suitable xenobiotic may be selected from the group consisting of benzene, toluene, styrene, xylene, pentachlorophenol, phenol, polychlorinated biphenyls and mixtures thereof. In another embodiment, the xenobiotic is a nitroarene compound such as a member selected from the group comprising 2,4,6-trintirotoluene, 1,3,5-trinitrobenzene and mixtures thereof.

It some cases, it may be preferred to select a organic solvent which, together with the xenobiotic will be co-metabolized. This approach is suitable for xenobiotics such as xylene. In this case, replenishment of both of the xenobiotic and the organic solvent will be desirable as both partition into the aqueous phase and become consumed by the microorganism.

The mode of combining the organic solvent and the xenobiotic is not particularly restricted and is within the purview of a person skilled in the art. The concentration of xenobiotic in the organic solvent is not particularly restricted provided that the concentration is not so high that the xenobiotic partitions into the aqueous in concentrations sufficiently high to damage or kill the microorganisms present in the aqueous phase. To some extent, the concentration will depend on the choice of solvent and its partition coefficient and log P value.

In a preferred second step in the present process involves preparing an aqueous phase comprising water and a microorganism capable of metabolizing the xenobiotic.

The choice of microorganism is not particularly restricted provided that it can metabolize or biodegrade the xenobiotic in question. Preferably, the microorganism is selected from the group of genera comprising Pseudomonas, Arthrobacter, Mycobacterium, Flavobacterium and mixtures thereof. More preferably, the microorganism is selected from the genus Pseudomonas. Even more preferably, the microorganism is selected from the group comprising *Pseudomonas putida, Pseudomonas cepacia, Mycobacterium chlorophenolicum* and mixtures thereof. Most preferably, the microorganism is a *Pseudomonas putida*.

The mode of combining the microorganism and water is not particularly restricted and is within the purview of a person skilled in the art. The initial concentration of microorganism in the aqueous phase is not particularly restricted provided that it is a "non-zero" concentration (e.g., an inoculum). As the process is carried the microorganism will consume the xenobiotic which is partitioned from the organic phase resulting in an increase in the population of microorganisms.

Of course, those of skill in the art will recognize that the aqueous phase may further comprise one or more other additives (e.g., nutrients, preservatives, solubilizing agents and the like) to sustain the microorganism.

Once prepared, the organic phase and the aqueous phase are combined in a suitable reactor such as a two-phase partitioning bioreactor—e.g., a New Brunswick Scientific BioFlo™ fermentor, preferably modified for aeration with a coarse glass sparger.

Upon contact of the organic phase and the aqueous phase, a portion of the xenobiotic is partitioned from the organic phase to the aqueous phase such that the concentration of the xenobiotic in the aqueous phase is substantially non-toxic to the microorganism. Once in the aqueous phase, the xenobiotic is metabolized or biodegraded by the microorganism.

When it is desired to operate the present process in batch or semi-batch mode (also known as "fed batch" or "sequential batch"), repeating the partitioning and biodegradation steps are repeated until the concentration of xenobiotic in the organic phase is reduced to a pre-determined value. Once the pre-determined value is reached, further xenobiotic is added to the organic phase and the process may be restarted or continued.

In one preferred embodiment, the following further steps are effected once the pre-determined value is reached:

removing the organic phase from the reactor;

adding further xenobiotic to the organic phase;

returning the organic phase to the reactor; and repeating the partitioning/biodegradation steps.

In another preferred embodiment, the following further steps are effected once the pre-determined value is reached:

removing the organic phase from the reactor;

adding to the reactor an organic phase containing a higher concentration of xenobiotic; and repeating the partitioning/biodegradation steps.

Alternatively, the process may be conducted in a continuous mode wherein further xenobiotic (and solvent if a biodegradable solvent is used) is continuously added to the organic phase as xenobiotic is partitioned to and biodegraded in the aqueous phase.

Examples of the present invention will be illustrated with reference to the following Examples which should not be used to limit or construe the scope of the invention.

EXAMPLE 1

The microorganism used for these experiments was *Pseudomonas putida* available under ATCC accession number 11172. The organism was maintained in liquid and solid culture, transferred weekly. The maintenance medium formulation used was as previously described (Fujita et al.[11]), with 5 g/L glucose and 100 mg/L phenol provided as carbon sources. Cultures were grown in 125 mL flasks containing 50 mL of medium in a shaker bath at 30° C. for 36 hours prior to inoculation of the fermentor. A total of 160 mL of inoculum from 4 flasks was concentrated by centrifugation, the supernatant decanted and the cell fraction resuspended in the remaining 40 mL of medium to prepare the final inoculum.

Fermentation was carried out in a 2 L New Brunswick Scientific BioFlo reactor modified for aeration with a fritted glass tube. The fermentor was operated at 30° C., agitated at 200 rpm and aerated at 0.25 vvm, based on the aqueous phase volume. The pH was controlled at 6.8 using 2N KOH.

The fermentor was heat sterilized with 1 L of medium (containing no carbon source) already in place. The sterilized medium was then inoculated, and 500 mL of the organic solvent, loaded with 4 g of phenol, was added, as depicted in the schematic diagram shown in FIG. 1. A control fermentor was also prepared in the same manner, but with a cell free aqueous phase, to test for possible volatilization of phenol due to air stripping.

Cell density was estimated by measuring the optical density of samples taken from the aqueous phase at 650 nm. Phenol concentrations in the aqueous phase were estimated using the 4-aminoantipyrine method (Der Yang et al.[12]) and a Bausch and Lomb Spectronic 2000 spectrophotometer. The samples were centrifuged prior to analysis in order to remove the cell fraction. The concentration of phenol in the organic phase was measured by contacting a sample taken from the organic phase with medium buffer using a Mixxor ä contacting system. The resulting mixture was centrifuged, the organic phase aspirated, and the buffer analyzed using the 4-aminoantipyrine method, as mentioned above. The amount of phenol present in the organic phase was then calculated by mass balance using an assumed partition coefficient. Related work had indicated that the partition coefficient for this ternary system is essentially constant over the concentration range employed.

Selection of an appropriate solvent was initiated using the Extractant Screening Program (ESP) developed by Bruce et al.[13] The ESP database, which contains data on over 1500 solvents, was used to select solvents with low volatilities, high partition coefficients, low solubilities in the aqueous phase, high selectivities and a log $P_{octanol}$ above the critical value. The critical log P value for this species was obtained from the literature (Inoue et al.[14]). The critical log P for this particular strain was later confirmed by experimentation. This initial screen produced a short list of solvents with the desired properties, as shown in Table 1.

TABLE 1

Short list of solvents for use in two phase system

| Solvent | log P | Partition Coefficient | Consumed as Substrate |
| --- | --- | --- | --- |
| 2-nonanol | 3.38 | 28.3 | No |
| 1-nonanol | 3.38 | 29.4 | Yes |
| 2-decanone | 3.39 | 49.7 | No |
| 2-decanol | 3.90 | 22.6 | No |
| 1-decanol | 3.90 | 23.2 | Yes |
| 1-undecanol | 3.90 | 20.8 | Yes |
| 2-undecanone | 3.91 | 47.6 | No |

Based on the properties listed above, as well as the comparative costs of the solvents, 2-undecanone was chosen for use in the fermentation. Four grams of phenol were dissolved in the organic phase. The experimentally determined partition coefficient indicated that the initial concentration of phenol in the aqueous phase would be approximately 168 mg/L, which was subsequently confirmed after initiating the experiment and allowing equilibration of phenol.

As shown in FIG. 2, an initial lag phase was seen over the first 12 hours, during which time very little phenol was consumed and correspondingly low cell growth was observed. After 24 hours, the cells were observed to have entered into the exponential growth phase. At this point some foaming was apparent in the fermentor, and the aqueous phase had taken on a distinct yellow colour. The appearance of this yellow colour has been reported to correspond to the presence of 2-hydroxy muconic semialdehyde, one of the intermediates in the phenol meta-cleavage pathway, in the fermentation broth (Molin et al.[5]). After 48 hours, a substantial volume of foam had accumulated on top of the organic phase, and the aqueous phase had returned to its original cream colour. FIG. 2 shows that the phenol in the system was consumed to exhaustion in just over 48 hours. The phenol concentration in the cell free fermentor was monitored for 48 hours and showed no loss of phenol to volatilization. The last 48 hours of the fermentation show a decline in cell density, and a corresponding increase in the pH of the aqueous phase was observed. This is likely due to cell lysis, as the cells entered the endogenous decay phase.

The volumetric phenol consumption rate for this system (based on the volume of the aqueous phase) is approximately 80 mg/L-h. This value is more than twice the highest value found in the literature for a batch system (37.5 mg/L-h; Fuijita et al.[11]). In addition, standard batch fermentations are limited to very low initial concentrations of phenol, in order to prevent substrate inhibition. The two phase system described here permits very high loading of phenol, well above the typical inhibitory value of 500 mg/L cited for this organism (Kotturi et al.[15]). The system is also self-regulating, with the organic phase continuously delivering phenol to the aqueous phase in accordance with the demand of the microorganisms. Given that a feedback control system to maintain an appropriate level of phenol in the medium is not currently available, and that a sensor for phenol has not yet been developed, this system provides an excellent option for demand-based phenol delivery, with minimal operational control required.

During fermentation, phenol levels in the aqueous phase are determined by the rate of consumption of phenol in this phase as well as by the rate of mass transfer of phenol from the organic phase to the aqueous phase. By comparing the phenol concentration in the aqueous phase to the expected concentration, based on the phenol level in the organic phase and the assumed partition coefficient, it is possible to determine which step is rate limiting. If the rate of mass transfer were limiting, the amount of phenol in the aqueous phase would be lower than expected, as the organisms would consume substrate faster than it could be delivered. If, however, the rate of consumption were limiting, the amount of phenol in the aqueous phase would be very close to the expected levels. It would appear, based on the data shown in FIG. 2, that the method of operation of this system provides sufficient contacting to permit equilibrium partitioning. As such, the rate of consumption of phenol by the microorganisms is the limiting factor in this fermentation.

The yield coefficient for this system was approximately 0.21 (g cells produced/g phenol consumed). The typical yield coefficient for this organism on phenol is substantially higher: 0.52+/−0.08 (Hill et al.[16]). The yield coefficient for the present work is based solely on the mass of cells found in the aqueous phase. This, however, is not an accurate estimate of the total mass of cells in the system, due to substantial wall growth, foaming and the presence of cells in the organic phase. It is not currently possible to estimate the mass of cells found outside the aqueous phase. Future efforts will attempt to address this issue by reducing the amount of foaming and wall growth.

As exemplified above, the use of a two phase organic-aqueous system to degrade high concentrations of phenol provides an excellent alternative to standard batch fermentations. The system permits high loading of phenol in the fermentor without substrate inhibition.

EXAMPLE 2

The two-phase partitioning bioreactor used in this Example utilized 2-undercanone and an aqueous phase containing *Pseudomonas putida* to degrade high concentrations of phenol. The solvent and organism were systematically selected to provide optimal system performance. The reactor was operated in both batch and fed batch (semi-batch) mode to illustrate the overall capacity of the system to degrade phenol. It is possible to achieve very high productivities using this system, using high initial concentrations of phenol in the organic phase. Phenol is partitioned into the aqueous phase in accordance with the known partition coefficient, at a rate determined by the metabolism of phenol by the microorganisms. The results of the present work suggest that this system can successfully overcome many of the disadvantages associated with the use of conventional batch and continuous culture bioreactors in the degradation of inhibitory compounds.

Microorganism and Medium Formulation

*Pseudomonas putida* available under ATCC accession number 11172, an organism known to degrade phenol by the meta pathway (Bayly et al.[17]) was used in this Example. The organism was maintained on medium previously described (Fujita et al.[11]), containing 5 g/L glucose and 100 mg/L phenol as carbon sources. EDTA was also added to the medium at a 1:1 molar ratio with ferric chloride to prevent the formation of a precipitate. Cultures were grown in 125 mL Erlenmeyer flasks containing 50 mL of maintenance medium in a shaker bath at 30° C. The flasks were allowed to incubate for 36 hours prior to their use as inoculum for fermentation. A total of 160 mL of the cultured medium was centrifuged, the supernatant discarded and the cell fraction resuspended in the remaining 40 mL of medium. The 40 mL aliquot was then used to inoculate the fermentor for the batch and fed batch experiments.

Biocompatibility Experiments

The biocompatibility of 13 solvents having a log P value (Laane et al.[18]) ranging from 1.3 to 9.2 was assessed to determine the critical log P for this strain. 5 mL of each solvent was added to 125 mL Erlenmeyer flasks containing 50 mL of maintenance medium seeded with 5 mL of stock culture. One flask was used as a control, and did not have any solvent added to it. The 14 flasks were placed in the shaker bath at 30° C. and incubated for 72 hours. Samples were taken every 24 hours to determine the change in cell density and the amount of glucose consumed. Cell density was estimated by measuring the optical density of the samples at 650 nm using a Brinkmann™ PC 600 Colorimeter. Glucose concentrations were measured by HPLC using a Sugar Pak™ column. The percent metabolic activity of the culture was then calculated relative to the control, based on net change in cell density and net glucose consumption and the critical log P for this organism was determined.

Determination of Partition Coefficients

A stock solution of medium buffer containing 5 g/L of phenol was prepared, and 5 mL samples of the medium buffer were then contacted with 5 mL of solvent using the Mixxor™ contacting system. The contacted samples were then centrifuged, and the organic phase was aspirated and discarded. Phenol concentrations in the buffer phase were assayed using the 4-aminoantipyrine method (Der Yang et al.[12]). A red colour was developed in the samples, and the absorbance of the solution was measured relative to a blank using a Bausch and Lomb Spectronic 2000™ spectrophotometer. The partition coefficient for phenol in each organic-aqueous system was then be determined by mass balance. Any solvents that formed emulsions with the aqueous phase were eliminated from the solvent screening process, due to the difficulties associated with calculating partition coefficients for these systems.

Biodegradation of Solvents

The biodegradability of the solvents was assessed as part of the solvent selection process. 5 mL of each solvent was added to 125 mL Erlenmeyer flasks containing 50 mL of seeded maintenance medium containing 250 mg/L phenol but no glucose. Solvent was not added to one flask, which was used as a control. In addition, 5 mL of corn oil was added to one flask, to serve as a positive control. Flasks were placed on the shaker bath as above for 7 days. The cell density in each flask was measured every 24 hours. The net change in cell density was then compared to the change in cell density seen in the control and the positive control. A change in cell density less than or equal to that seen in the control was seen as evidence that the solvent was not consumed by the cells, whereas a change in cell density greater than that seen in the control was taken as evidence that the solvent was consumed by the cells. A change in cell density greater than the positive control indicated that the solvent could be readily used as a substrate by the cell culture.

Batch Fermentation 1: Degradation of 4 g of Phenol

A 2 L New Brunswick Scientific BioFlo™ fermentor modified for aeration with a coarse glass sparger was used to carry out this work. The fermentor, containing 1 L of carbon-free medium was autoclaved, following which 500 mL of solvent, in which 4 g of phenol was dissolved, was added. The bioreactor was maintained at 30° C., agitated at 200 rpm and aerated to 0.25 vvm, based on aqueous phase volume. The pH was controlled at 6.8 using 2N KOH. A control fermentor with a cell free aqueous phase was also prepared in this manner, to assess the possible loss of phenol to volatilization.

Batch Fermentation 2: Degradation of 10 g of Phenol

A 2 L BioFlo™ fermentor was prepared as above, with 10 g of phenol dissolved in the organic phase. To allow for complete biodegradation of the substrate, the carbon-free medium formulation was doubled in concentration, in order to provide adequate nutrients for the fermentation. The fermentor was initially aerated to 0.25 vvm and agitated at 200 rpm, but during the fermentation aeration was increased to 0.5 vvm, and agitation to 250 rpm, to increase the mass transfer of oxygen to the cells. A dissolved oxygen electrode was used to monitor the level of oxygen in the aqueous phase. The pH of the system was controlled at 6.8 using 1N KOH.

Fed Batch Fermentation: Degradation of 28 g of Phenol

The fermentor was prepared as above, but with a second glass sparger added to improve aeration. A propeller was added to the stir shaft of the fermentation vessel, in an attempt to reduce foaming. The fermentation was allowed to progress normally, but when the phenol concentration in the organic phase reached 2 g/L, 250 ml of the organic phase was removed, and spiked with approximately 9 g of phenol. The organic sample was then returned to the reactor, bringing the overall concentration of phenol in the organic phase back to 20 g/L. This was done twice, at 72 hours and at 120 hours. Nutrient spikes (the standard carbon-free medium formulation dissolved in 50 mL of water, instead of 1 L) were also added at 96 hours and at 132 hours, to avoid nutrient depletion in the aqueous phase. The fermentor was initially aerated to 0.25 vvm and agitated at 200 rpm, but this was increased to 0.5 vvm and 250 rpm when the system became oxygen limited at 48 hours. This rapidly led to a problem with foaming and overflow, so the aeration was reduced to 0.3 vvm at 72 hours.

Analytics

Samples were taken from the organic and aqueous phases every twelve hours throughout the fermentations. Samples were centrifuged prior to analysis to separate the cell fraction, aqueous phase and organic layer. Phenol concentrations in the aqueous phase were assayed using the 4-aminoantipyrine method as described above. The organic samples were contacted with medium buffer using the Mixxor™ contacting system. The resulting mixture was then centrifuged, and the organic phase aspirated off. Phenol levels in the buffer were then determined as above, and the experimentally determined partition coefficient was used to calculate the concentration of phenol present in the organic phase. Cell density was assessed as described above. Consumption of base was also monitored.

Solvent Selection

The initial solvent selection process was undertaken using the Extractant Screening Program (ESP), developed by Bruce et al.[13] The ESP database contains thermodynamic data on over 1500 solvents. These compounds were screened for high boiling points, low solubilities in the aqueous phase, high partition coefficients and log P values above the critical value of 3.1 obtained from the literature (Inoue et al.[14]). The predicted properties of these solvents are summarized in Table 2. Included in this table are experimental data concerning the tendency of the solvent to form an emulsion with the aqueous phase, which was deemed not to be desirable.

TABLE 2

List of solvents with desired properties obtained from search through the ESP database

| Solvent | Predicted Partition Coefficient | Solubility in Water (mol/L) | Boiling Point (° C.) | log P | Formed an Emulsion? |
|---|---|---|---|---|---|
| 2-decanone | 115 | 0.000011 | 210.0 | 3.39 | − |
| 2-undecanone | 93 | 0.000004 | 231.2 | 3.91 | − |
| 9-decen-1-ol | 18 | 0.000086 | 236.0 | 3.54 | − |
| 2-nonanol | 15 | 0.000053 | 193.0 | 3.38 | − |
| 1-nonanol | 15 | 0.000053 | 193.5 | 3.38 | + |
| 2-decanol | 13 | 0.000018 | 211.0 | 3.90 | − |
| 1-decanol | 13 | 0.000018 | 228.0 | 3.90 | − |
| 1-undecanol | 12 | 0.000006 | 248.1 | 3.90 | − |
| diethyl suberate | 92 | $1.1 \times 10_{-7}$ | 284.0 | 3.31 | +++ |
| diethyl azelate | 79 | $3.1 \times 10_{-8}$ | 172.0 | 3.83 | +++ |
| diethyl sebacate | 69 | $9.1 \times 10_{-9}$ | 312.0 | 4.35 | ++ |
| octyl acetate | 65 | $7.9 \times 10_{-7}$ | 207.0 | 3.92 | ++ |
| ethyl heptanoate | 54 | 0.000002 | 188.0 | 3.40 | ++ |

Biocompatibility of Solvents and the Critical Log P

The experimental data shown in FIG. 3 represent the metabolic activity of the microorganisms in the presence of 13 solvents with a log P value ranging from 1.3 to 9.2, as identified in the Figure. Metabolic activity in the presence of each solvent was determined as a function of glucose consumed and increase in cell density, relative to a control (no solvent present). The data demonstrate that in the presence of solvents with a log P value below 3.2 the cell is completely inhibited, and metabolic activity ceases. However, in the presence of solvents with a log P value above 3.2, the cell is able to function normally. As such, the experimentally determined critical log P for this organism is 3.2. Metabolic activity around this critical value is present, but is not at 100% of normal levels. Solvents were excluded from further steps in the solvent selection process if their log P value fell below the critical value.

Final Selection of the Appropriate Solvent

A short list of solvents that did not form emulsions with the aqueous phase was compiled and is shown in Table 3. The solvents were then subjected to experiments to examine the extent to which they could be used as carbon sources for the microorganism. Only those solvents which were not consumed by the microorganisms were considered appropriate for use in the two phase bioreactor. Solvents were also compared based on their cost, and the experimentally determined partition coefficients. The solvent that had the most desirable properties based on these criteria was 2-undecanone, and which was then used in the batch and fed batch fermentations.

TABLE 3

Short list of solvents for use in the two phase partitioning bioreactor

| Solvent | log P | Experimental Partition Coefficient | Consumed as Substrate? | Cost ($/L) |
|---|---|---|---|---|
| 2-nonanol | 3.38 | 28.3 | − | 806.00 |
| 1-nonanol | 3.38 | 29.1 | + | 95.40 |
| 2-decanone | 3.39 | 49.7 | − | 1004.00 |
| 2-decanol | 3.90 | 22.6 | − | 1920.00 |
| 1-decanol | 3.90 | 23.2 | ++ | 22.00 |
| 1-undecanol | 3.90 | 20.8 | + | 112.60 |
| 2-undecanone | 3.91 | 47.6 | − | 70.20 |
| corn oil | — | — | + | — |

Batch Fermentation 1: Degradation of 4 g of Phenol 4 g of phenol was dissolved into the organic phase to provide an initial concentration of 168 mg/L in the aqueous phase. This concentration was chosen because it is well below the typical inhibitory value of 500 mg/L for this organism (Kotturi et al.[15]). As shown in FIG. 4, the system experienced an initial lag phase during the first 12 hours. The organism then rapidly passed into the exponential growth phase during which the majority of the phenol in the system was consumed. During this stage, foam began to accumulate on top of the organic phase, and the aqueous phase took on a distinct yellow colour. This colour has been reported to correspond to the appearance of 2-hydroxy muconic semialdehyde, one of the intermediates in the meta pathway for phenol degradation (Molin et al.[5]). The yellow colour began to fade at 48 hours, and had disappeared by 60 hours, leaving the aqueous phase its original beige colour. Exhaustion of the phenol in the system was followed by cell death, as indicated by the decline in cell density and an observed increase in pH, typically seen with cell lysis. The control (cell-free) fermentor confirmed that no phenol was lost due to air stripping, as demonstrated previously (Shishido et al.[19]).

Batch Fermentation 2: Degradation of 10 g of Phenol

In a subsequent experiment, the organic phase was loaded with 10 g of phenol, to deliver an initial concentration of approximately 420 mg/L phenol to the aqueous phase. The higher loading resulted in a prolonged lag phase of about 24 hours as shown in FIG. 5, during which no significant cell growth or consumption of phenol occurred. During this period, the dissolved oxygen concentration in the fermentation broth stayed close to 100%. As the cells entered the exponential growth phase, the appearance of the yellow colour was once again observed, as well as significant foaming and wall growth. The dissolved oxygen concentration dropped to 0% at 36 hours, in response to which the aeration was increased to 0.5 vvm, and the agitation to 250 rpm. Despite these measures, the culture remained oxygen limited (D.O.=0%) until 72 hours. After 72 hours, the aqueous phase was no longer yellow, and the fermentor contained almost 500 mL of foam on top of the organic layer. At this point, the dissolved oxygen concentration and the pH in the aqueous phase began to rise, and the cell density began to decline, as was expected, based on the previous experiment.

Fed Batch Fermentation: Degradation of 28 g of Phenol

The use of a fed batch mode of operation was examined to determine the capacity of the system to degrade phenol. In order to reduce the amount of foaming in the system, a propeller was added to the stir shaft above the organic phase. In addition, in an attempt to increase the mass transfer of oxygen to the cells, a second sparger was added to the fermentor. The organic phase was loaded with an initial 10 g of phenol. The culture again experienced a 24 hour lag phase as shown in FIG. 6, followed by a 48 hour exponential growth phase. During this phase the dissolved oxygen concentration remained at 0%, and significant foaming occurred. After 72 hours, the organic phase was spiked with an additional 9 g of phenol, to return the overall concentration of phenol in the system to 20 g/L. The fermentation was allowed to continue until the dissolved oxygen concentration began to rise at 96 hours, accompanied by a decline in cell density, at which point a nutrient spike was added. The culture rapidly recovered, and the dissolved oxygen concentration once again dropped to 0%. After 120 hours, the organic phase was spiked again with 9 g of phenol to return to the original concentration of 20 g/L. A nutrient spike was added at 132 hours to prevent the aqueous phase from becoming nutrient depleted. The last 10 g of phenol were consumed to exhaustion in under 168 hours, at which point the dissolved oxygen concentration rose above zero, and the pH rose to 8.0.

This Example illustrates the feasibility of a two phase bioreactor scheme for degrading phenol. The results in this Example indicate that this system is a practical and effective alternative to conventional alternatives for the bioremediation of phenol. The demand based mode of phenol delivery to the microorganisms allows the phenol concentration in the aqueous phase to remain below inhibitory levels, and yet still provides enough of the carbon source to prevent substrate limitation. The batch system has been shown to have a volumetric phenol consumption rate (based on the volume of the aqueous phase) of approximately 135 mg/L-h. This is significantly higher than the maximum volumetric consumption rate reported in the literature of 37.5 mg/L-h (Fujita et al.[11]). The fed batch system had an even higher volumetric consumption rate of 175 mg/L-h. The use of a fed batch mode of operation allows for a much greater quantity of phenol to be degraded than in a standard batch reactor, and it eliminates the lag phase of cell growth for the spikes of phenol, as the existing cell population is already acclimatized to high concentrations of phenol.

The yield coefficient for the two phase batch system used to degrade 4 g of phenol was 0.20 g cells/g phenol. This value is lower than the typical literature value of 0.52+/− 0.08 g/g (Hill et al.[16]). The cell density for this system was measured only in the aqueous phase, and as a result, the cells in the foam, in the organic layer and immobilized by wall growth were not included in the estimate of the cell population in this system. The effect of biofilm formation (in the form of foam or wall growth) on the calculation of kinetic parameters has previously been documented (Molin et al.[5]), and shown to produce erroneously low estimates. This concept is supported by the reduced cell yields seen in the 10 g batch system (0.15 g/g) and the 28 g fed batch system (0.12 g/g). These systems experienced considerably more foaming and wall growth than the initial batch system, and as a result had a significant cell population outside of the bulk aqueous phase. An attempt was made to control foaming in the fed batch system through the use of a propeller at the top of the stir shaft, but it did not noticeably diminish the foaming. Whatever phenol may have been present in the foam was consumed by the cells; either directly by cells also present in the foam, or as a result of the subsequent collapse of the foam back into the bulk aqueous phase which occurred near the time of substrate depletion.

The biphasic bioreactor has been shown to have a high capacity to degrade phenol, with the fed batch system degrading 28 g of phenol in about 165 hours. This considerable quantity of phenol was degraded with minimal external operational control (i.e. the cells themselves controlled the feeding rate), and with very low energy inputs required for aeration and agitation. The system requires only pH and temperature control during operation. The system is self regulating in terms of phenol delivery to the aqueous phase, so phenol concentrations need only be monitored in the fed batch system, to determine when further phenol additions are necessary.

LIST OF PRIOR ART REFERENCES

The following list of references is referred to hereinabove, the contents of each of which are hereby incorporated by reference:

1. Kobayashi, H. and Rittmann, B. E (1982), MICROBIAL REMOVAL OF HAZARDOUS ORGANIC COMPOUNDS, *Environ. Sci. Technol.* 16: 170A–183A.
2. Evans, W. C. (1947), OXIDATION OF PHENOL AND BENZOIC ACID BY SOME SOIL BACTERIA, *J. Biol. Chem.*, 41: 373–382.
3. Andrews, J. F. (1968), A MATHEMATICAL MODEL FOR THE CONTINUOUS CULTURE OF MICROORGANISMS USING INHIBITORY SUBSTRATES, *Biotechnol. Bioeng.*, 10: 707–723.
4. Pawlowsky, U., Howell, J. A. and Chi, C. T. (1973), MIXED CULTURE BIOOXIDATION OF PHENOL III. EXISTENCE OF MULTIPLE STEADY STATES IN CONTINUOUS CULTURE WITH WALL GROWTH, *Biotechnol. Bioeng.*, 15: 905–916.
5. Molin, G. and Nilsson, I. (1985), DEGRADATION OF PHENOL BY PSEUDOMONAS PUTIDA ATCC 11172 IN CONTINUOUS CULTURE AT DIFFERENT RATIOS OF BIOFILM SURFACE TO CULTURE VOLUME, *Appl. Environ. Microbiol.*, 50: 946–950.
6. Barton, W. E. and Daugulis, A. J., EVALUATION OF SOLVENTS FOR EXTRACTIVE BUTANOL FERMENTATION WITH CLOSTRIDIUM ACETOBUTYLICUM AND THE USE OF POLY(PROPYLENE GLYCOL) 1200, *Appl. Microbiol. Biotechnol.*, 36, 632–639 (1992).
7. Jones, T. D., Havard, J. M. and Daugulis, A. J., ETHANOL PRODUCTION FROM LACTOSE BY EXTRACTIVE FERMENTATION, *Biotechnology Letters*, 15, 871–876 (1993).
8. Daugulis, A. J., Axford, D. B., Cizek, B. and Malinowski, J. J. (1994), SOLVENT SELECTION FOR EXTRACTIVE BIOCATALYSIS, *Biotechnol. Prog.*, 7: 116–124.
9. Vermue, M., Sikkema, J., Verheul, A. Bakker, R. and Tramper, J. (1993), TOXICITY OF HOMOLOGOUS SERIES OF ORGANIC SOLVENTS FOR THE GRAM-POSITIVE BACTERIA ARTHROBACTER AND NOCARDIA sp. AND THE GRAM-NEGATIVE BACTERIA ACINETOBACTER AND PSEUDOMONAS sp. *Biotechnol. Bioeng.*, 42: 747–758.
10. El Aalam, S. Pauss, A. and Lebeault, J. M. (1993), HIGH EFFICIENCY STYRENE BIODEGRADATION IN A BIPHASIC ORGANIC/WATER CONTINUOUS REACTOR, *Appl. Microbiol. Biotechnol.*, 39: 696–699.
11. Fujita, M., Ike, M. and Kamiya, T. (1993), ACCELERATED PHENOL REMOVAL BY AMPLIFYING THE GENE EXPRESSION WITH A RECOMBINANT PLASMID ENCODING CATECHOL-2,3-OXYGENASE, *Wat. Res.*, 27: 9–13.
12. Der Yang, R. and Humphrey, A. E. (1975), DYNAMIC AND STEADY STATE STUDIES OF PHENOL BIODEGRADATION IN PURE AND MIXED CULTURES, *BiotechnoL Bioeng.*, 17: 1211–1235.
13. Bruce, L. J. and Daugulis, A. J. (1991), SOLVENT SELECTION STRATEGIES FOR EXTRACTIVE BIOCATALYSIS, *Biotech. Prog.*, 7: 116–124.
14. Inoue, A. and Horikoshi, K. (1991), ESTIMATION OF SOLVENT TOLERANCE OF BACTERIA BY THE SOLVENT PARAMETER LOG P, *J. Ferm. Bioeng.*, 71: 194–196.
15. Kotturi, G., Robinson, C. W. and Inniss, W. E. (1991), PHENOL DEGRADATION BY A PSYCHROTROPHIC STRAIN OF PSEUDOMONAS PUTIDA, *Appl. Microbiol. Biotechnol.*, 34: 539–543.
16. Hill, G. A. and Robinson, C. W. (1975), SUBSTRATE INHIBITION KINETICS: PHENOL DEGRADATION BY PSEUDOMONAS PUTIDA, *Biotechnol. Bioeng.*, 17: 1599–1615.
17. Bayly, R. C. and Wigmore, G. J. (1973), METABOLISM OF PHENOL AND CRESOLS BY MUTANTS OF PSEUDOMONAS PUTIDA, *J. Bact.*, 113: 1112–1120.
18. Laane, C., Boeren, S. and Vos, K. (1985), ON OPTIMIZING SOLVENTS IN MULTI-PHASE BIOCATALYSIS, *Trends Biotechnol.*, 3: 251–252.
19. Shishido, M. and Toda, M. (1996), APPARENT ZERO-ORDER KINETICS OF PHENOL BIODEGRADATION BY SUBSTRATE-INHIBITED MICROBES AT LOW SUBSTRATE CONCENTRATIONS, *Biotechnol. Bioeng.*, 50: 709–717.

What is claimed is:

1. A fed batch process for biodegradation of a xenobiotic comprising the steps of:
   (i) preparing an aqueous phase comprising water and a microorganism capable of metabolizing the xenobiotic;
   (ii) preparing an organic phase comprising the xenobiotic at an initial concentration and at least one water-immiscible organic solvent, the solvent having a partition coefficient of at least 20 and a log P value greater than the critical log P value for the microorganism;
   (iii) contacting the organic phase and the aqueous phase in a reactor;
   (iv) allowing a portion of the xenobiotic to spontaneously partition from the organic phase to the aqueous phase, said initial concentration being set such that said portion is below a level which is toxic to said microorganism;
   (v) causing the microorganism to metabolize the xenobiotic in the aqueous phase;
   (vi) determining the concentration of xenobiotic in the organic phase;
   (vii) adding further xenobiotic to the organic phase when the concentration of the xenobiotic in the organic phase is reduced to approximately 2 g/L; and
   (viii) repeating steps (iv) to (vii)
   wherein said process exhibits enhanced productivity over productivity observed in a batch process due to elimination of lag phase of microorganism cell growth when xenobiotic is added as in sub-paragraph (vii) above.

2. The process defined in claim 1, wherein the microorganism is a Gram-negative bacterium.

3. The process defined in claim 1, wherein the microorganism is selected from the group of genera consisting of Pseudomonas, Arthrobacter, Mycobacterium, Flavobacterium and mixtures thereof.

4. The process defined in claim 1, wherein the microorganism is selected from the group consisting of *Pseudomonas putida, Pseudomonas cepacia, Mycobacterium chlorophenolicum* and mixtures thereof.

5. The process defined in claim 1, wherein the microorganism is a *Pseudomonas putida*.

6. The process defined in claim 1, wherein the organic solvent has a partition coefficient of at least about 35.

7. The process defined in claim 1, wherein the organic solvent has a log P value of at least about 3.2.

8. The process defined in claim 1, wherein the organic solvent has a partition coefficient of at least about 25 and a log P value of at least about 2.5.

9. The process defined in claim 1, wherein the organic solvent has a partition coefficient of at least about 35 and a log P value of at least about 3.2.

10. The process defined in claim 1, wherein the organic solvent is selected from the group consisting of alcohols, ketones, esters, aldehydes and mixtures thereof.

11. The process defined in claim 1, wherein the organic solvent is selected from the group consistin of 1-nonanol, 2-nonanol, 3-nonanol, 1-decanol, 2-decanol, 3-decanol, 1-undecanol, 2-undecanol, 3-undecanol, 1-dodecanol, 2-dodecanol, 3-dodecanol, 1-nonanone, 2-nonanone, 3-nonanone, 1-decanone, 2-decanone, 3-decanone, 1-undecanone, 2-undecanone, 3-undecanone, 1-tridecadione, 2-tridecadione, 3-tridecadione, 1-tetradecadione, 2-tetradecadione, 3-tetradecadione, decen-1-ol, oleyl alcohol, diethyl sebacate, diethyl suberate, diethyl azelate, octyl acetate, ethyl heptanoate, structural isomers thereof and mixtures thereof.

12. The process defined in claim 1, wherein the organic solvent comprises 2-undecanone.

13. The process defined in claim 1, wherein the xenobiotic is a substituted organic compound.

14. The process defined in claim 1, wherein the xenobiotic is selected from the group consisting of benzene, toluene, styrene, xylene, pentachlorophenol, phenol, polychlorinated biphenyls and mixtures thereof.

15. The process defined in claim 1, wherein the xenobiotic is a nitroarene compound.

16. The process defined in claim 15, wherein the nitroarene compound is selected from the group consisting of 2,4,6-trinitrotoluene, 1,3,5-trinitrobenzene and mixtures thereof.

17. The process defined in claim 1, wherein step (vii) comprises the steps of:
   (a) removing the organic phase from the reactor;
   (b) adding further xenobiotic to the organic phase when the concentration of xenobiotic in the organic phase is reduced to approximately 2 g/L; and
   (c) returning the organic phase to the reactor.

18. The process defined in claim 1, wherein step (vii) comprises the steps of:
   (a) removing the organic phase from the reactor when the concentration of the xenobiotic in the organic phase is reduced to approximately 2 g/L; and
   (b) adding to the reactor an organic phase containing a higher concentration of xenobiotic.

19. The process defined in claim 1, wherein said initial concentration is 20 g/L.

20. A fed batch process for biodegradation of a xenobiotic comprising the steps of:
   (i) preparing an aqueous phase comprising water and a microorganism capable of metabolizing the xenobiotic;

(ii) preparing an organic phase comprising the xenobiotic at an initial concentration and at least one water-immiscible organic solvent, the solvent having a partition coefficient of at least 20 and a log P value greater than the critical log P value for the microorganism;

(iii) contacting the organic phase and the aqueous phase in a reactor;

(iv) allowing a portion of the xenobiotic to spontaneously partition from the organic phase to the aqueous phase, said initial concentration being set such that said portion is below a level which is toxic to said microorganism;

(v) causing the microorganism to metabolize the xenobiotic in the aqueous phase;

(vi) determining the concentration of xenobiotic in the organic phase; and (vii) adding further xenobiotic to the organic phase when the concentration of the xenobiotic in the organic phase is reduced to approximately 2 g/L wherein said process exhibits enhanced productivity over productivity observed in a batch process due to elimination of lag phase of microorganism cell growth when xenobiotic is added as in sub-paragraph (vii) above.

21. The process defined in claim 20, wherein said initial concentration is 20 g/L.

22. A fed batch process for biodegradation of a xenobiotic comprising the steps of:

contacting an organic phase comprising the xenobiotic at an initial concentration and at least one water-immiscible organic solvent, the solvent having a partition coefficient of at least 20 and a log P value greater than the critical log P value for a microorganism capable of metabolizing the xenobiotic, with an aqueous phase comprising water and the microorganism;

allowing a portion of the xenobiotic to spontaneously partition from the organic phase to the aqueous phase, said initial concentration being set such that said portion is below a level which is toxic to said microorganism;

causing the microorganism to metabolize the xenobiotic in the aqueous phase;

determining the concentration of xenobiotic in the organic phase; and adding further xenobiotic to the organic phase when the concentration of the xenobiotic in the organic phase is reduced to approximately 2 g/L wherein said process exhibits enhanced productivity over productivity observed in a batch process due to elimination of lag phase of microorganism cell growth when xenobiotic is added responsive to reduction of concentration thereof below said initial concentration.

23. The process defined in claim 22, wherein said initial concentration is 20 g/L.

* * * * *